(12) United States Patent
Bacos et al.

(10) Patent No.: US 8,617,323 B2
(45) Date of Patent: Dec. 31, 2013

(54) PROCESS FOR PROTECTING THE SURFACE OF A SUBSTRATE OF INTERMETALLIC ALLOY WITH A TITANIUM ALUMINIDE BASE AGAINST CORROSION

(75) Inventors: Marie-Pierre Bacos, Antony (FR); Pierre Josso, Issy les Moulineaux (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 312 days.

(21) Appl. No.: 12/169,581

(22) Filed: Jul. 8, 2008

(65) Prior Publication Data
US 2009/0017329 A1    Jan. 15, 2009

(30) Foreign Application Priority Data
Jul. 9, 2007    (FR) ...................... 07 04957

(51) Int. Cl.
  C23C 14/34    (2006.01)
  C25D 7/00    (2006.01)
  C25D 9/00    (2006.01)
  C25D 11/00    (2006.01)

(52) U.S. Cl.
  USPC .......................................... 148/518; 428/660

(58) Field of Classification Search
  USPC .............. 419/23; 205/242; 148/518; 428/660
  See application file for complete search history.

(56) References Cited

U.S. PATENT DOCUMENTS

| | | | |
|---|---|---|---|
| 4,137,370 A | 1/1979 | Fujishiro et al. | |
| 4,181,590 A | 1/1980 | Fujishiro et al. | |
| 4,309,256 A * | 1/1982 | Aliprandini | 205/242 |
| 5,129,574 A | 7/1992 | Tobin | |
| 5,205,876 A | 4/1993 | Sakai | |
| 5,318,214 A | 6/1994 | Lucas, Jr. et al. | |
| 5,326,525 A * | 7/1994 | Ghosh | 419/23 |
| 5,368,660 A | 11/1994 | Durlu et al. | |
| 5,879,760 A | 3/1999 | Eylon et al. | |
| 2007/0281175 A1 | 12/2007 | Hoffmann et al. | |

FOREIGN PATENT DOCUMENTS

FR    2 857 892    1/2005

OTHER PUBLICATIONS

French Search Report, dated Jan. 25, 2008, corresponding to FR 07/04957.
Leyens, "Oxidation and Protection of Titanium Alloys and Titanium Aluminides," Titanium and Titanium Alloys, Fundamentals and Applications, Jan. 28, 2005, pp. 187-230, XP-002465915.
Izumi, et al., "Sulfidation properties of TiAl ± 2 at. % X (X=V, Fe, Co, Cu, Nd, Mo, Ag and W) alloys at 1173 K and 1.3 Pa sulphur pressure in as $H_2S$-$H_2$ gas mixture," Intermetallics 8 (2000) pp. 891-901 (On Order).

(Continued)

Primary Examiner — Weiping Zhu
(74) Attorney, Agent, or Firm — Christie, Parker & Hale, LLP

(57) ABSTRACT

The method according to the invention comprises the following operations:
a) prepare a substrated formed of the said intermetallic alloy;
b) deposit a coating of gold on the surface to be protected of the substrate; and
c) subject the substrate thus equipped with the gold coating to annealing in controlled conditions in order to bring about limited diffusion of the gold into the surface to be protected. The invention is applicable in particular to parts of gas turbines, e.g. parts of aircraft engines.

17 Claims, 2 Drawing Sheets

(56) References Cited

OTHER PUBLICATIONS

Figure 1:
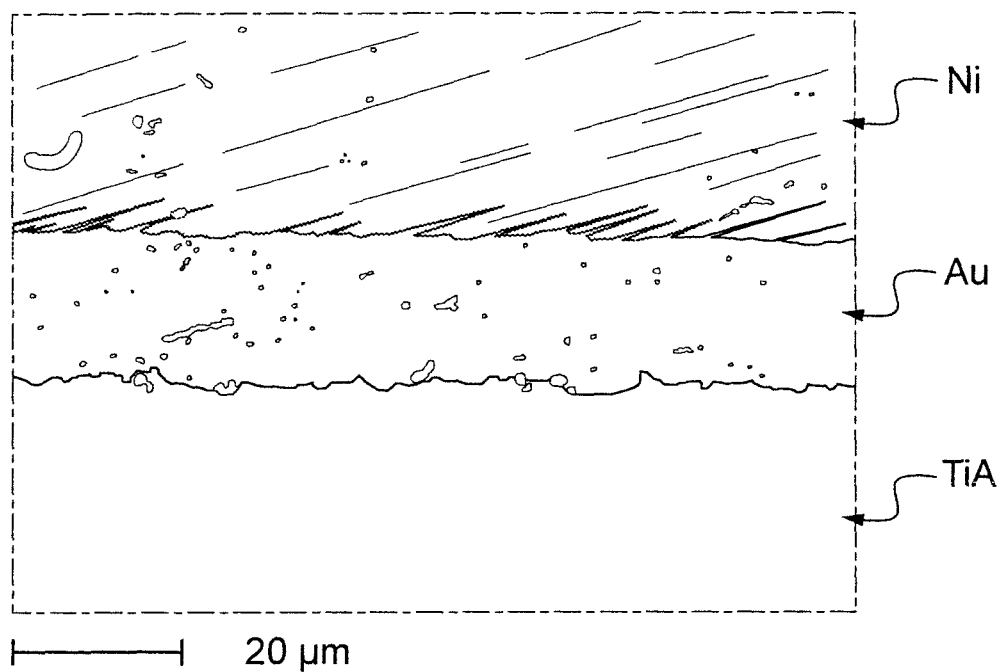

Niewolak, et al., "Oxidation behaviour of Ag-containing TiAl-based intermetallics," Intermetallics 12 (2004) pp. 1387-1396 (On Order).
Nicholls, et al., "Hot salt corrosion of titanium aluminides," Materials and Corrosion, 48 (1997) pp. 54-64 (On Order).
Yao, et al., "NaCl-induced hot corrosion of a titanium aluminide alloy," Materials Science and Engineering 92/193 (1995) pp. 994-1000 (On Order).
Search Report dated Jan. 25, 2008, for corresponding French Patent Application No. 0704957.
Leyens, C., "Oxidation and Protection of Titanium Alloys and Titanium Aluminides", Titanium and Titanium Alloys, Fundamentals and Applications; 2003 Wiley-VCH Verlag GmbH & Co. KGaA, Weinheim; pp. 187-230.
Izumi, Takeshi, et al., Sulfidation properties of TiAl-2 at. % X (X=V, Fe, Co, Cu, Nb, Mo, Ag and W) alloys at 1173 K and 1.3 Pa sulfur pressure in an $H_2S$-$H_2$ gas mixture; Elsevier Intermetallics 8 (2000); pp. 891-901.
Niewolak, L., et al., "Oxidation behaviour of Ag-containing TiAl-based intermetallics"; Elsevier Intermetallics 12 (2004); pp. 1387-1396.
Yao, Z., et al., "NaCl-induced hot corrosion of a titanium aluminide alloy"; Elsevier Materials Science and Engineering A192/193(1995); pp. 994-1000.
Nicholls, J. R., et al., "Hot salt corrosion of titanium aluminides"; Materials and Corrosion 48, (1997); pp. 56-64.
A. Motayed et al.; *Realization of improved metallization-Ti/Al/Ti/W/Au ohmic contacts to n-GaN for high temperature application*; Phys. stat.sol. (c) 2, No. 7, 2536-2539; Wiley-VCH Verlag GmbH & Co. KGaA. Weinheim; Feb. 8, 2005; 4 Pages.
ASM International 2006; ASM Alloy Phase Diagrams Center; http://www.1.asminternationa.org/asmenterpise; Feb. 14, 2012; 5 Pages.
ASM International 2006; ASM Alloy Phase Diagrams Center; http://www.1.asminternationa.org/asmenterpise; Mar. 1, 2012; 6 Pages.

\* cited by examiner

PROCESS FOR PROTECTING THE SURFACE OF A SUBSTRATE OF INTERMETALLIC ALLOY WITH A TITANIUM ALUMINIDE BASE AGAINST CORROSION

CROSS-REFERENCE TO RELATED APPLICATION

This application claims priority of French patent application Ser. No. 07/04957, filed on Jul. 9, 2007.

The invention relates to a process for protecting the surface of a substrate of intermetallic alloy with a titanium aluminide base against corrosion by oxygen, sulphur compounds and halogenated compounds. It also relates to protected parts so obtained.

Due to their low density and their good mechanical properties, titanium aluminides are potential candidates for high or medium temperature applications, such as gas turbines, on board or otherwise, in particular parts of aircraft engines. As examples, blades for free turbines (maximum temperature of use of 800° C.) and turbojet diffusers (maximum temperature of use of 600° C.) can be cited.

Free turbine blades must be essentially resistant to oxidation and to a corrosive environment composed of oxygen, sodium sulphate ($Na_2SO_4$) and of a low percentage of sodium chloride (NaCl). Alloys intended for this application by motorists are casting alloys or forged alloys with a high lamellar fraction and high intrinsic resistance to oxidation, of the type TiAl G4 (developed by the Applicant) or an alloy with a high niobium content, also developed by the Applicant.

The colder parts, such as for example the diffuser ($T_{max}$ 600° C., $T_{average}$ 450-500° C.) located in front of the combustion chamber but touching the gas stream must resist the effects of corrosion due to a severe environment such as saline fog, a crucial problem for sea helicopters. For this application, the alloy used is a conventional alloy Ti-48Al-2Cr-2Nb (% by atoms), also known as TiAl 48-2-2, and which is an essentially gamma alloy.

However, in order for such applications to be conceivable, it is necessary to improve the resistance to oxidation and to corrosion of titanium aluminides, particularly in a halogenated environment. In fact, research into the corrosion of TiAl alloys carried out by the Applicant shows that, on the one hand, there is corrosion by sodium sulphate and that, on the other hand, this corrosion is heavily aggravated by the presence of sodium chloride. This research has shown that the corrosion mechanism brings about the formation of an aluminium chloride which, upon oxidation, forms hydrogen chloride gas which reacts in turn with the titanium aluminide to re-form aluminium chloride which will subsequently oxidise. The same phenomenon takes place with titanium. This is therefore a self-perpetuating type of corrosion. It has been found that this type of corrosion takes place upward of 600° C. and is very damaging to parts subjected, inter alia, to sea mists, such as high-pressure blades of the compressor or diffuser.

Moreover, in general, the resistance to oxidation of titanium aluminides is insignificant after 700° C., since, upon oxidation, these materials do not develop a stable, sealing-tight layer of alumina. Generally, the oxide layer formed is complex and composed of plural strata: a surface layer of non-stoichiometric titanium oxide, an intermediate layer of alumina, and an internal layer composed of a mixture of alumina and titanium oxide. Under this latter complex layer is found an underlayer poor in aluminium and sometimes titanium nitrides. After several hours of oxidation (300-500 hours), dissolution of the dense alumina layer is observed, which precipitates towards the external layer in the form of non-continuous islets, bringing about an increase in kinetic oxidation; this is the rupture phase known as "break away". The mechanism by which the addition of elements in a low quantity makes it possible to reduce kinetic oxidation of the TiAl compounds is still controversial.

Finally, it is also important to note that, whilst the effect of oxygen at high temperature on the surface is relatively well known (oxidation), the effects of corrosion in the presence of condensable sulphurous or chloridic phases are much less clearly recognised.

Starting from this realisation, the Applicant has made its objective to protect such an intermetallic alloy with a base of titanium aluminide.

It is important to note here that the invention is only applicable to titanium aluminides. Titanium aluminide is meant to convey a defined compound with a base of aluminium and titanium forming an intermediate phase which only exists in the ordered state.

From the three possible phases in the binary diagram of aluminium and titanium, only two compounds are useful industrially: alloys with a base of γ-TiAl and those with a base of the compound α2-$Ti_3Al$. It is to these compounds that is the invention is applicable.

Indeed, unlike pure metals or their alloys, the diffusion of a third element is heavily slowed down in an ordered phase. Alloys with a base of titanium aluminide according to the invention can therefore contain, besides aluminium and alumina, other metallic components, e.g. chromium, niobium, rhenium etc with the aim of improving their properties.

The Applicant has set itself the task of protecting such an intermetallic alloy by depositing a metallic element which, by diffusion, is capable of modifying the chemical composition of the intermetallic alloy TiAl over a low thickness and so to form a protective coating at its surface.

The research of the Applicant met with numerous difficulties in practice.

Indeed, the entire analysis of the literature demonstrates the difficulty of finding such a protective element which is both effective, whatever the environment, and non-damaging to the alloy in terms of mechanical properties. Some elements (such as Nb) which are very positive for resistance to oxidation will strongly decrease resistance to corrosion by sulphates and chlorides.

Starting from this analysis, the authors wished to explore the contribution that a coating with a base of gold—a metal very resistant to corrosion by oxygen, sulphur and halogens—could make to protecting titanium aluminides.

To the knowledge of the Applicant, the protection of titanium aluminides by gold has not been explored till now.

However, gold is found in the composition of certain intermetallic alloys, although gold is added to these mainly for microstructural reasons (U.S. Pat. No. 5,205,876) where its concentration is between 0.01 and 0.05% (by mass). Still in is terms of microstructure, U.S. Pat. No. 5,368,660 teaches that gold can be used advantageously to form dual-phase alloys with the following formula: $TiAl_2+Ti_{(25\ to\ 35\%\ by\ weight)}Au_{(<5\%\ by\ weight)}Al_{(60\ to\ 70\%\ by\ weight)}$.

Gold is also used as a brazing metal. A foil or deposit of gold in a thickness of between 0.02 and 0.1 mm is inserted between two parts to be assembled and the assembly is brought to the temperature of about 1,400° C., which makes it possible to obtain a eutectic fusion of the compound $Au_{16}Ti_{84}$, whose melting point is 1,367° C. (U.S. Pat. No. 5,318,214).

However, gold is also used as a diffusion barrier in certain composite systems of TiAl+SiC fibres. In fact the term "diffusion barrier" is incorrect, for, as U.S. Pat. No. 5,326,525 teaches, the noble metal (copper, silver or gold) is melted and then diffuses into the titanium aluminide matrix to form, ultimately, an alloy with a low content of this element.

An advantageous technology is described in U.S. Pat. No. 5,879,760. This consists in applying a beta-type titanium alloy to a titanium aluminide ($\alpha 2$ or $\gamma$) reinforced with fibres or not. The deposit of the ductile alloy, 25 to 100 µm thick, can be effected by diffusion welding or by plasma projection under reduced pressure. This layer is then coated by a deposit of noble metal such as ruthenium, rhodium, palladium, osmium, iridium, gold or platinum or by a deposit of tungsten followed by a deposit of ruthenium, rhodium, palladium, osmium, iridium, gold or platinum. The thickness of the noble metal is between 0.5 and 1.5 µm. The preferred noble metal is an alloy of platinum with 20% rhodium. Obviously, although this is not claimed, the noble alloy diffuses during service into the layer of ductile alloy. The ratio of thickness between the two layers of the coating (i.e. ductile alloy of titanium+noble metal) indicates that it is in no way sought to obtain a particular protective layer.

In the prior art taken into account by this invention, two memoranda filed by Fujishiro et al. will be noted (U.S. Pat. No. 4,137,370 and U.S. Pat. No. 4,181,590) where it is taught that it is possible to deposit on the surface of a compound with a titanium base between 0.5 and 1.5 µm gold in order to improve both its mechanical properties and its oxidation properties at high temperature.

These three last patents apply a deposit of gold to the surface of a titanium-based alloy and not to an intermetallic alloy in the sense of a defined compound forming an ordered phase, as was mentioned above.

A reading of the binary diagram of gold-titanium shows that the noble metal can be dissolved in a matrix of titanium up to a concurrence of 25% in atomic concentration, that is 60% by mass. Beyond this limit, defined compounds such as $Ti_3Au$, $TiAu$, $TiAu_3$ and $TiAu_4$ are formed. This amounts to saying that if a deposit of gold were applied to a lightly-alloyed titanium alloy, of the type TA6V, there would be, during service, interdiffusion between the substrate and the coating, such that the protective effect sought could not be obtained.

On the other hand, the literature dealing with the protection or standing up to the environment of alloys enriched with silver is relatively abundant. It is noted in this literature that silver cannot be a universal protective coating because although it improves oxidation-resistance at high temperature (up to 800° C.), its corrosion properties, particularly in the presence of sulphur, are generally insufficient, as T Izumi et al. show in "Sulfidation properties of TiAl±2 at. % X (X=V, Fe, Co, Cu, Nb, Mo, Ag and W) alloys at 1173 K and 1.3 Pa sulphur pressure in an $H_2S$—$H_2$ gas mixture" (Intermetallics 8 (2000) 891-901). Moreover, as L Niewolak et al. note in "Oxidation behaviour of Ag-containing TiAl-based intermetallics" (Intermetallics 12 (2004) 1387-1396) the maximum solubility of silver in a TiAl alloy is at the maximum of 4.8 at. % and this solubility decreases with the aluminium content of the intermetallic alloy. Conversely, it can be said that if the aluminium content decreases severely, as in ductile titanium alloys where it is less than 6 at. %, the solubility of this element is increased. Consequently, a deposit of the order of 1 to 2 µm on to the surface of a deposit of titanium alloy with a low aluminium content 50 times thicker will bring about the total dissolution of the noble element during service. Now, silver and gold are elements which are chemically very close (column IB of the Periodic Table of Elements). Consequently, one can conclude that a low deposit of gold on the surface of a titanium alloy with a low aluminium content will bring about disappearance of this element during service.

Thus, nothing in the prior art could teach nor suggest to the person skilled in the art to use a coating of gold to protect against the corrosion of a substrate of intermetallic alloy with a base of titanium aluminide.

In a first aspect, the invention proposes a process for protecting the surface of a substrate of intermetallic alloy with a base of titanium aluminide against corrosion, which comprises the following operations:

a) prepare a substrate formed of the said intermetallic alloy;

b) deposit a coating of gold on the surface to be protected of the substrate; and c) subject the substrate thus equipped with the gold coating to annealing in controlled conditions in order to bring about limited diffusion of the gold into the surface to be protected.

Such a coating with a gold base has the advantage of being easily deposited by conventional technologies, in particular electrolytic means. However, other technologies of depositing are conceivable, such as vapour phase deposition, painting, leaf adhesion, etc. Moreover, the diffusion annealing makes it possible to obtain at the surface a composition which is heavily enriched with gold, of the composition $TiAlAu_3$, whose further diffusion with the intermetallic alloy TiAl will be limited and controlled.

It should be noted here that gold can be subject to different types of corrosion.

Indeed, during service, from 600° C., this material is subjected to three types of corrosion. The first, the most well-known, is an oxidation which takes place in four stages, I, II, III and IV. During stages I and II, the kinetics observed follow a linear equation. This equation is generally attributed to the formation of a film of oxide which is non-protective and discontinuous, such that oxygen passes through it. During stage III, a parabolic equation is observed, characteristic of a thin film of oxide which is continuous and protective, whose growth is controlled by diffusion mechanisms of the metal or oxygen through the oxide. The speed of the reaction decreases as the layer of oxide formed increases, without however cancelling the same. Finally, stage IV, known as "break away", corresponds to breakage of this continuous film leading rapidly to deterioration of the material.

The second type of degradation is corrosion by sulphides. In the above-mentioned application to parts of aircraft engines, this corrosion only takes place downstream of the combustion chamber where sodium sulphate is formed by the combination of sodium chloride of the atmosphere with sulphur dioxide formed by oxidation of the sulphurous compounds contained in kerosene. This corrosion takes place above 700° C. and becomes extremely harmful when the condensed phase (sodium and potassium sulphate) becomes liquid.

Finally, the third mode of degradation discovered has been studied very recently, inter alia by J R Nicholls et al. in: "Hot salt corrosion of titanium aluminides" (Materials and Corrosion, 48, 1997, 54-64) or by Z Yao et al. in "NaCl-induced hot corrosion of a titanium aluminide alloy" (Materials Science and Engineering 92/193, 1995, 994-1000). These results were confirmed and complemented by the present inventors' own research into corrosion. It appears from this research that the corrosion mechanism brings about the formation of an aluminium chloride which upon oxidising forms hydrogen chloride gas which in turn reacts with the titanium aluminide in order to re-form aluminium chloride which will then oxidise. The same phenomenon takes place with titanium. This type of corrosion occurs from 600° C. onward, and is very harmful for the parts subjected, inter alia, to sea mists, such as the high-pressure blades of the compressor or diffuser.

In order to be able to be used, a protective coating must make it possible to combat these three types of degradation. Moreover, the coating, once created, must remain at the surface and not diffuse into the substrate, and conversely the substrate must diffuse as little as possible into the coating. As already mentioned, the elements of column IB of the periodic table of elements are not very soluble in titanium aluminides. Now, although copper and silver offer little protection with respect to elements such as oxygen, sulphur and halogens, gold is however reputed for being very unreactive to these elements.

That is why the present inventors have decided to test this element as a protective coating of titanium aluminides both against oxidation and corrosion. The solution has been tested by means of a very severe device applied by the Applicant: the samples are introduced into a saline fume cupboard for 16 hours. Therein, a mist is atomised from a solution of 50 g/l sodium chloride. The samples were then weighed and subject to a temperature of 600° C. for 6 hours in a furnace in air. The entirety of these treatments corresponds to a cycle of corrosion repeated until total deterioration of the part (10 cycles maximum, given the severity of the test). From there, the corrosion curves were plotted by eliminating the quantity of salt added at each cycle. This test was complemented by a conventional test of the service life of the protected part both in cyclic oxidation and in cyclic corrosion in a hot environment in the presence of condensed phases (sulphates, chlorides etc.).

The candidate metal or alloy for acting as a coating must during oxidation either not form oxides between the ambient temperature and 800° C., the maximum temperature of use of the titanium aluminides, or must form very stable oxides. In hot corrosion in the presence of condensed phases, the candidate metal or alloy must not form either sulphides or hyposulphites, nor sulphites or sulphates. Finally, in the presence of halogens such as chlorine or fluorine, the metal or alloy must not form volatile nor unstable salts. Consequently, this definition can only apply to a noble metal such as platinum, iridium, gold, and to a lesser extent, to rhodium and palladium. Finally, a last condition will be demanded of the candidate metal or alloy: to interdiffuse as little as possible with the substrate on the one hand in order not to weaken the mechanical properties, and on the other hand in order to preserve the initial chemical composition of the coating.

Few metals or alloys respond to these criteria. Ultimately, only gold has seemed to correspond to these conditions. Indeed, it does not form stable oxides between the ambient temperature and 800° C. ($\Delta G$ formation $Au_2O_3$ at 800° C.=+44 kcal/mole $O_{2\ gas}$), it does not form volatile sulphides ($\Delta G$ formation $AuS_{gas}$ at 800° C.=+22 kcal/mole $H_2S_{gas}$) and it does not form volatile halides (only $AuCl_{gas}$ is capable of forming but with a $\Delta G$ formation of +37 kcal/mole $HCl_{gas}$). These figures are to be compared with that concerning aluminium $\Delta G$ formation of $AlCl_{3\ gas}$=−18 kcal/mole $HCl_{gas}$, negative enthalphy therefore the reaction is spontaneous.

Before effecting the deposition of the gold coating, it is appropriate first to treat the surface to be protected in advance. The preparation operation a) is carried out preferably according to technologies which are known per se. It comprises advantageously a pre-treatment of the surface to be protected by sand-blasting, then a treatment, at least one acid etching, followed by rinsing.

Preferably, the deposition operation b) is carried out by electrolytic means from a gilding bath. Advantageously, to this end a gilding bath is used comprising a solution of sodium sulphite containing metallic gold. However, other gilding technologies are conceivable: vapour phase deposition, painting, leafing etc.

This deposition operation b) is carried out in conditions such that the gold coating has a thickness of at least 2.5 μm, preferably between 20 and 40 μm. There is no determining upper limit for the thickness of the gold coating, except reasons of cost.

The annealing operation c) is preferably carried out at high temperature and under reduced pressure in order to form the phases $TiAlAu_3$, $TiAlAu_2$ and $TiAlAu$.

The annealing operation c) is carried out at a temperature of between 850 and 1050° C., preferably about 900° C., and in a vacuum of better than $10^{-3}$ Pa.

Following this annealing, the process of the invention may comprise a supplementary operation consisting of: d) depositing on the gold coating forming an underlayer an additional coating of another material in order to protect against erosion.

This other material may be a metal such as pure gold or another metal which does not form oxides, nor sulphides or halides, such as platinum, palladium, osmium, rhodium, iridium of ruthenium. This other material may also be a ceramic with a base of oxides, carbides or nitrides, as is well-known to the person skilled in the art.

The process of the invention may comprise a further operation consisting of carrying out a repeated annealing under a vacuum in order to regenerate the gold coating in the case of halogenated corrosion.

This halogenated corrosion manifests itself in a depletion by elimination of the volatile halides such as $AlCl_3$ or $AlF_3$, $TiCl_4$ or $TiF_4$.

In another aspect, the invention relates to a part comprising a substrate of intermetallic alloy with a titanium aluminide base whose surface has been protected against corrosion by a process such as defined above. Such a part is intended above all for a gas turbine, in particular an aircraft engine.

Figure 2:
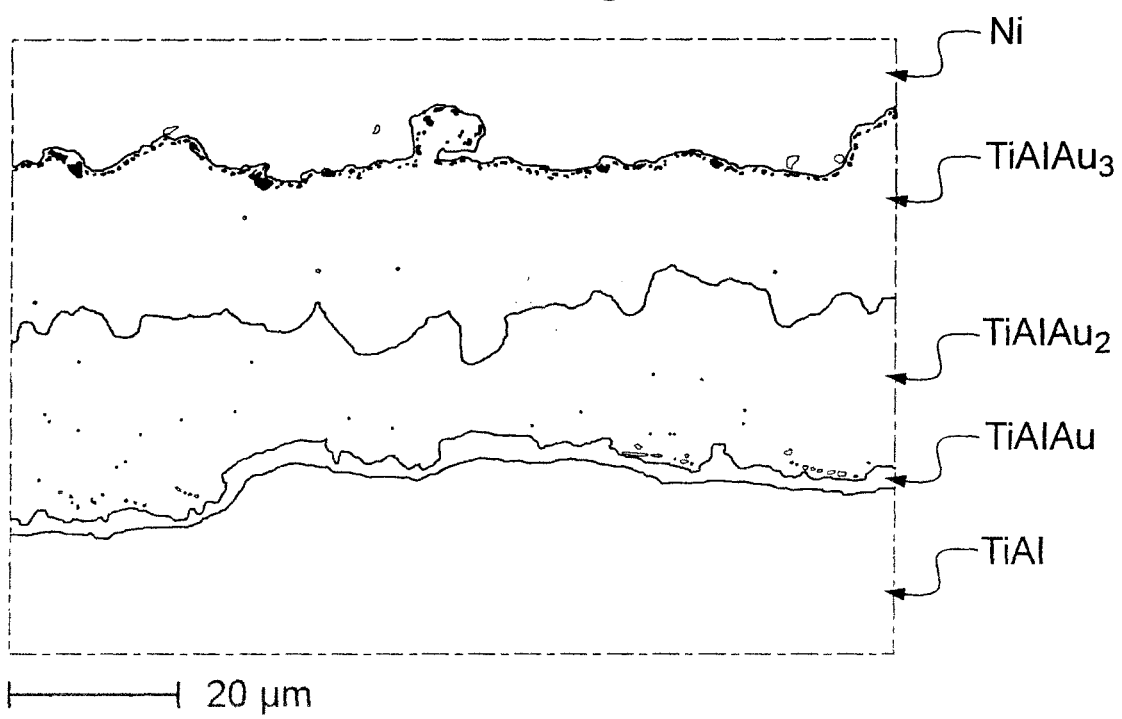
Figure 3:
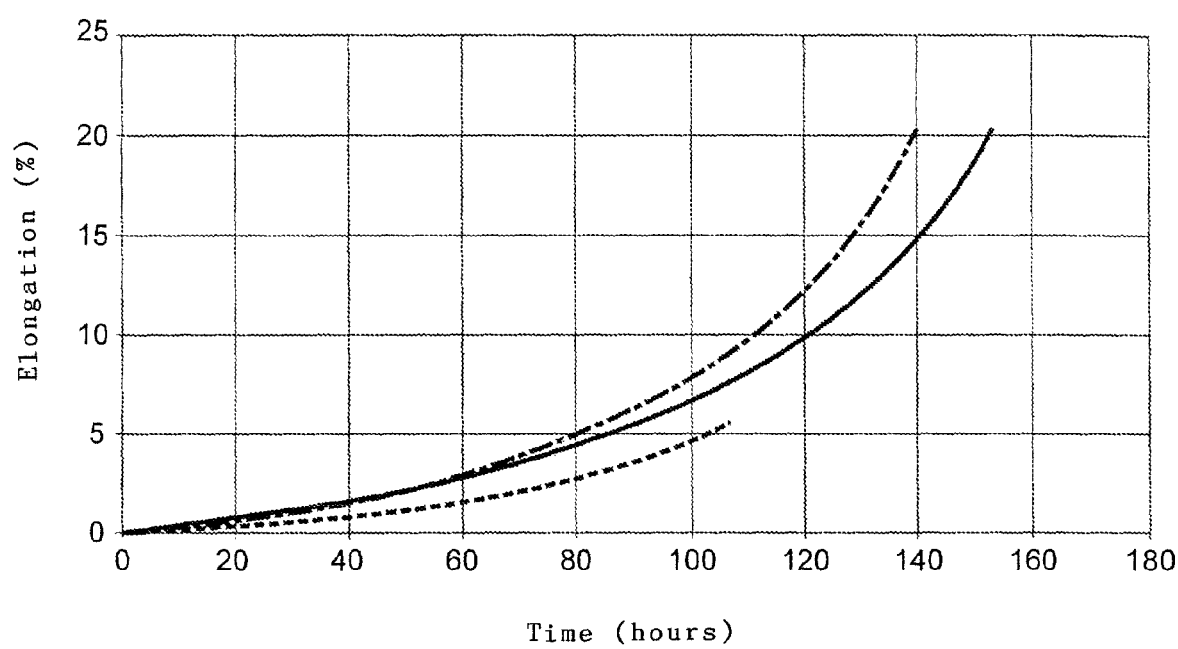

In the detailed description below, given solely by way of example, the attached drawings will be referred to, which show:

FIG. 1, a micrographic section obtained by observation with an electron retrodiffusion microscope, of a sample comprising a coating of 20 μm gold deposited on a substrate of TiAl without annealing;

FIG. 2, a similar micrographic section of a sample comprising a coating of 40 μm gold deposited on a substrate of TiAl with annealing; and FIG. 3, a diagram representing the variations in percentage elongation over time (in hours) for three different states of an intermetallic alloy with a base of TiAl.

In FIG. 1, it can be seen that a substrate 1 formed of an intermetallic alloy with a base of TiAl is equipped with a coating of gold 2, in the raw deposited state, with a regular thickness of 20 μm. This deposit of gold was carried out by electrolysis of a solution of this metal. On the gold coating 2 was deposited a coating of nickel 3 by electrolytic means, solely in order to facilitate observation of the sample by electron microscope. In this particular case, the sample was not subject to annealing.

In the case of FIG. 2, a coating of gold 2 with a thickness of 40 μm was deposited on the substrate 1 and annealing was then carried out at 900° C. in a furnace under a vacuum of better than $10^{-3}$ Pa. As in the previous case, a coating of nickel 3 was carried out in order to facilitate observation.

The sample shown in FIG. 2 has a microstructure of three successive phases: TiAlAu, $TiAlAu_2$ and $TiAlAu_3$, starting from the surface of the substrate towards the nickel coating. This microstructure is significant because it shows a certain similarity with the ternary diagram TiAl(Ni, Cu) where the phases TiAlAu$_3$ would be equivalent to the phase 4, TiAlAu$_2$ to the phase 3 and TiAlAu to the phase τ2, thus confirming the low solubility of gold in titanium aluminide as was demonstrated by the Applicant in FR 2 857 892.

The coating showed good properties both in oxidation and sulphurous or chloric corrosion.

The invention is further illustrated by the following examples.

EXAMPLE I

An alloy of titanium aluminide with a conventional composition Ti-48Al-2Cr-2Nb (at. %; this alloy is also known as TiAl 48-2-2) was coated with gold according to the following process:
- liquid sand-blasting at 3 bar,
- rinsing with distilled water,
- etching with HF (10%)/HNO3 (30%),
- etching with HCl (30%)
- rinsing with distilled water,
- nickel by Wood 2 min 30 at cathode,
- rinsing with distilled water,
- placing in gold bath under voltage.

The operations of preparation or processing which precede the deposition operation are conventional. They have the aim of preparing the surface of the substrate for gilding. The sand-blasting is carried out in a humid medium in order to facilitate the elimination of the sand and to limit abrasion of the surface. The acid etchings are also conventional. The application of nickel by Wood avoids making the substrate unreactive.

The electrolytic gold bath used is completely free of cyanide. It is composed thus:

| | |
|---|---|
| Concentration of metal gold | 10 g/L |
| Potassium sulphite | 35 g/L |
| Temperature | 55° C. |
| pH | 9.5 |
| Density of current | J = 0.35 A/dm$^2$ |

This bath with a commercial reference E-55 was supplied by the firm Metalor Technologies, and its output is close to 100%.

After about 1 hour 30 minutes' deposition, a gold deposit is obtained which is very adhesive and with a thickness of 20 μm. The coated substrate is then annealed in a vacuum better than 10$^{-3}$ Pa at 900° C. for 2 hours. The coating is ready. Its microstructure is the same as that shown in FIG. 2.

This coated alloy and an uncoated reference piece are oxidised at 800° C., corroded in the presence of condensed phases and, to finish, are corroded in the presence of a halogenated substance (sodium chloride).

The results obtained are assembled in the following table:

| Type of test | temperature | Number of cycles of one hour | Δm/S (mg/cm$^2$) raw | Δm/S (mg/cm$^2$) coated according to the invention |
|---|---|---|---|---|
| Cycled oxidation | 800° C. | 1000 | 2.0 | 0.6 |
| Sulphurous corrosion | 800° C. | 1000 | −2.9 | 0.5 |
| Halogenated corrosion | 600° C. | 5 large cycles | −6.8 corroded substrate | −6.8 healthy substrate |

(Δm/S designates the increase in mass per unit surface)

It was found that, whatever the corrosive technique used, the coating significantly improves the environmental properties of the alloy in oxidation at high temperature and in hot corrosion. On the other hand, failing to improve the behaviour in halogenated corrosion, it does not deteriorate the same. The metallographic post mortem examinations show that in fact the coating remains intact whatever the type of attack to which it is subjected. In the case of halogenated corrosion, it was even found that there was an enrichment of gold in the external coating, thus indicating that only the elements titanium and aluminium of the phase TiAlAu$_3$ are eliminated in the form of volatile halides.

This depletion is significant as it shows that the protective element is not eliminated during the oxidation, sulphurous corrosion and halogenated corrosion operations. From this, after a simple de-oxidation/de-sulphurisation such as is practised by the person skilled in the art, it suffices to repeat annealing in a vacuum in order to regenerate the coating. Obviously, this regeneration operation is limited in time, since, upon completion, interdiffusion of the substrate and coating could create Kirkendall-type porosities.

FIG. 3 compares the mechanical properties in flow of the TiAl 48Al-2CR-2Nb under 300 MPa at 700° C. according to three states: raw from processing (solid line), raw from coating (dot-dash line) and after 5 large cycles in saline corrosion (dotted line). It was found that although the gold coating slightly decreases the mechanical properties of the intermetallic alloy, it makes it possible, on the other hand, to preserve these at their best when the alloy is exposed to conditions of service. Moreover, it is important to note that only the duration of tertiary flow is modified according to the state of the material. Indeed, under this constraint, the duration of secondary flow (about 23 hours) remains unchanged whatever the state of the material (raw, protected or protected/corroded).

EXAMPLE II

It is proposed to protect a substrate of titanium aluminide alloy α2-Ti$_3$Al in the same way. The coating procedure is the same as that described in example I. The results obtained are assembled in the following table:

| Type of test | Temperature | Number of cycles of one hour | Δm/S (mg/cm$^2$) raw | Δm/S (mg/cm$^2$) coated according to the invention |
|---|---|---|---|---|
| Cycled oxidation | 800° C. | 60 | 2.7 | 0.6 |
| | | | | 1000 cycles: 7.1 |

-continued

| Type of test | Temperature | Number of cycles of one hour | Δm/S (mg/cm²) raw | Δm/S (mg/cm²) coated according to the invention |
|---|---|---|---|---|
| Sulphurous corrosion | 800° C. | 100 | −0.9 corroded substrate | 5.9 healthy substrate |

The contribution of this coating on this type of substrate is spectacular, in spite of an excessively high test temperature for this type of substrate. Here, too, it was found during post mortem examinations that the coating undergoes depletion thus bringing about enrichment with gold of the coating.

EXAMPLE III

The procedure was the same as in example I but the substrate Ti-48Al-2CR-2Nb underwent special heat treatment modifying its microstructure in order to make the same completely lamellar. This microstructure makes it possible to improve the mechanical properties of this alloy.

It is protected with a coating of gold of 20 μm obtained according to the procedure described in example I (deposition+annealing under vacuum at 900° C.). The results obtained are assembled in the following table:

| Type of test | Temperature | Number of cycles of one hour | Δm/S (mg/cm²) raw | Δm/S (mg/cm²) coated according to the invention |
|---|---|---|---|---|
| Cycled oxidation | 800° C. | 1000 | 1.9 | 1.8 |
| Sulphurous corrosion | 800° C. | 1000 | −1.5 | 3.9 |
| Halogenated corrosion | 600° C. | 5 large cycles | −8.0 corroded substrate | −9.3 healthy substrate |

It was found that the contribution of this coating to this type of substrate is important, a contribution confirmed by the examination of the microstructures which show that the phase $TiAlAu_3$ is again present throughout the specimen except for that having undergone halogenated corrosion where enrichment with gold by depletion was established.

The invention claimed is:

1. A process for protecting a surface of a substrate of intermetallic alloy with a base of titanium aluminide against corrosion, characterised in that it comprises:
   a) preparing a substrate formed of said intermetallic alloy;
   b) depositing a coating of gold on the surface of the substrate to be protected; and
   c) subjecting the substrate so equipped with the gold coating to annealing in controlled conditions to bring about a controlled diffusion of the gold into the surface to be protected against corrosion wherein said surface becomes an exposed surface comprising titanium, aluminide, and gold as a ternary phase.

2. The process according to claim 1, characterised in that the intermetallic alloy is selected from alloys with a base of γ-TiAl and alloys with a base of α2-$Ti_3Al$.

3. The process according claim 1, characterised in that the operation of preparation a) comprises pre-treatment of the surface to be protected by sand-blasting, then treatment by at least one acid etching stage followed by rinsing.

4. The process according to claim 1, characterised in that the operation of deposition b) is carried out electrolytically with a gilding bath.

5. The process according to claim 4, characterised in that the gilding bath comprises a solution of sodium sulphite containing metallic gold.

6. The process according to claim 1, characterised in that the deposition operation b) is carried out in conditions such that the gold coating has a thickness of at least 2.5 μm.

7. The process according to claim 1, characterised in that the annealing operation c) is carried out at high temperature and under reduced pressure to form the phases $TiAlAu_3$, $TiAlAu_2$ and TiAlAu.

8. The process according to claim 7, characterised in that the annealing operation c) is carried out at a temperature of between 850 and 1050° C. and under a vacuum of better than $10^{-3}$ Pa.

9. The process according to claim 7, characterised in that the annealing operation c) is carried out under a vacuum of better than $10^{-3}$ Pa.

10. The process according to claim 1, characterised in that it comprises a supplementary operation consisting in:
    d) depositing on the gold coating forming an underlayer an additional coating of another material to act as protection against erosion.

11. The process according to claim 10, characterised in that this other material is a metal such as pure gold or another metal not forming oxides nor sulphides nor halides, such as platinum, palladium, osmium, rhodium, iridium and ruthenium.

12. The process according to claim 10, characterised in that this other material is a ceramic with a base of oxides, carbides, or nitrides.

13. The process according to claim 1, characterised in that it further comprises carrying out a repeated anneal under vacuum to regenerate the gold coating in a case of halogenated corrosion.

14. The process according to claim 13, characterised in that the halogenated corrosion is manifested by depletion of the volatile halides such as $AlCl_3$ or $AlF_3$, $TiCl_4$ or $TiF_4$.

15. The process according to claim 1, wherein the depositing operation b) is carried out in conditions such that the gold coating has a thickness between 20 and 40 μm.

16. A process for protecting a surface of a substrate of intermetallic alloy with a base of titanium aluminide against corrosion, characterised in that it comprises:
    a) preparing a substrate formed of said intermetallic alloy;
    b) depositing a coating of gold on the surface of the substrate to be protected; and
    c) subjecting the substrate so equipped with the gold coating to annealing under a vacuum at a temperature of between 850° C. and 1050° C. to bring about at least a limited diffusion of the gold into the surface to be protected against corrosion, wherein said surface becomes an exposed surface comprising titanium, aluminide, and gold as a ternary phase.

17. The process according to claim 16, characterised in that the annealing operation is carried out under a vacuum of better than $10^{-3}$ Pa.

* * * * *